United States Patent [19]

Watkins et al.

[11] Patent Number: 5,032,624

[45] Date of Patent: Jul. 16, 1991

[54] REACTION PRODUCTS OF P-VINYL PHENOL AND POLYISOCYANATES

[75] Inventors: James W. Watkins; Darrell D. Hicks, both of Louisville, Ky.

[73] Assignee: Hoechst Celanese Corporation, Somerville, N.J.

[21] Appl. No.: 513,229

[22] Filed: Apr. 23, 1990

Related U.S. Application Data

[62] Division of Ser. No. 113,902, Oct. 29, 1987, Pat. No. 4,985,587.

[51] Int. Cl.$^5$ .............................................. C08F 2/46
[52] U.S. Cl. .................................... 522/96; 522/90; 526/301
[58] Field of Search ..................... 526/301; 522/90, 96

[56] References Cited

U.S. PATENT DOCUMENTS

| | | | |
|---|---|---|---|
| 4,385,171 | 5/1983 | Schnabel et al. | 560/25 X |
| 4,587,323 | 5/1986 | Toman | 560/25 X |

FOREIGN PATENT DOCUMENTS 2063248  6/1981  United Kingdom ................. 560/25

*Primary Examiner*—Joseph L. Schofer
*Assistant Examiner*—J. M. Reddick
*Attorney, Agent, or Firm*—Herbert P. Price; Shirley L. Church

[57] ABSTRACT

Polyunsaturated compounds useful in radiation curable compositions are made by reacting p-vinylphenol and a polyisocyanate in the ratio of one mole of p-vinylphenol for each isocyanate group of the polyisocyanate.

8 Claims, No Drawings

REACTION PRODUCTS OF P-VINYL PHENOL AND POLYISOCYANATES

CROSS REFERENCE TO RELATED APPLICATIONS

This is a division of Ser. No. 113,902, filed Oct. 29, 1987 U.S. Pat. No. 4,985,587.

BACKGROUND OF THE INVENTION

The field of art to which this invention is directed is polyethylenically unsaturated monomers.

Polyethylenically unsaturated monomers, i.e., monomeric compounds which contain terminal unsaturation, are well known compositions which have a variety of uses. Such monomers are useful as reactive components and reactive diluents in radiation curable coating compositions, as reactive components in thermosetting polyester compositions and as cross-linking additives for styrene monomers.

In U.S. Pat. No. 3,297,745, polymerizable monomers which contain at least two ethylenically unsaturated carbon-to-carbon bonds and at least two urethane linkages are described. These monomers are prepared by reacting an organic polyisocyanate with an ethylenically unsaturated alcohol, e.g., allyl alcohol or hydroxyalkyl acrylate.

Polyethylenically unsaturated esters made by reacting polybasic acids or acid chlorides with hydroxyalkyl acrylates or methacrylates are described in U.S. Pat. No. 3,560,237.

The reaction of isopropenylphenol with acids or acid chlorides to form polyethylenically unsaturated esters is described in U.S. Pat. No. 3,259,605. The isopropenyl group is somewhat difficult to polymerize, particularly by radiation.

SUMMARY OF THE INVENTION

This invention is directed to polymerizable, polyethylenically unsaturated oligomers. In one aspect, this invention pertains to polyethylenically unsaturated oligomers wherein the unsaturated groups are vinyl aromatic groups. In another aspect, this invention relates to polyethylenically unsaturated oligomers which contain urethane linkages.

The oligomers of this invention can be represented by the structure:

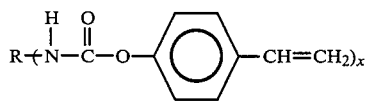

wherein x is an integer of 2 to 4 and R is an organic radical having a valence equal to x, wherein R is the nucleus, after removal of the isocyanate groups, of:

A. an aliphatic, aromatic, polyaromatic, aralkyl, alkaryl, or cycloaliphatic di, tri, or tetraisocyanate, or B. a prepolymer of an aliphatic, aromatic aralkyl, alkaryl, or cycloaliphatic diisocyanate and a polyol reacted in the ratio of one mole of diisocyanate for each hydroxyl group of the polyol, wherein the polyol is an aliphatic hydrocarbon diol, triol, or tetraol or a polyether or a polyester diol or triol.

The polymerizable, polyethylenically unsaturated urethane oligomers are prepared by reacting p-vinylphenol with an organic di, tri or tetraisocyanate in the ratio of one mole of p-vinylphenol for each equivalent of isocyanate group of the polyisocyanate.

The oligomers of this invention are useful as components in radiation curable coating compositions and in thermosetting molding compositions.

DESCRIPTION OF THE INVENTION p-Vinylphenol, or 4-hydroxystyrene as it is also called, is a known compound used to prepare homopolymers and copolymers for various industrial applications. Corson et al., Journal of Organic Chemistry, 23, 544–549 (1958), describe a 5 step process for making p-vinylphenol from phenol. The phenol is first acetylated to p-hydroxyacetophenone which is then acetylated to p-acetoxy-acetophenone. This compound is hydrogenated to p-acetoxyphenylmethyl carbinol which is then dehydrated to p-acetoxystyrene. The p-acetoxystyrene is saponified to p-vinylphenol using potassium hydroxide.

The organic polyisocyanates useful in this invention are those polyisocyanates which contain two, three, or four isocyanate groups per molecule and no other groups which are reactive with hydroxyl groups under the conditions employed in this invention, i.e., under conditions wherein isocyanate groups and hydroxyl groups react. Such organic polyisocyanates include aliphatic, aromatic, aralkyl, alkaryl, or cycloaliphatic di, tri, or tetraisocyanates. Examples of these polyisocyanates are 1,6-hexamethylene diisocyanate, 1,4-hexamethylene diisocyanate 2,2,4-trimethylhexamethylene diisocyanate, 1,3-trimethylene diisocyanate, toluene diisocyanate, m-phenylenediisocyanate, p-phenylenediisocyanate, 4,4'-diphenyldiisocyanate, 1,5-naphthalenediisocyanate, 4,4'-toluidine diisocyanate, 1,4-xylylene diisocyanate, methylene bis(4-cyclohexyl isocyanate), 1,3-cyclopentane diisocyanate, isophorone diisocyanate, 1,4-cyclohexane diisocyanate, triphenyl methane-4,4',4''-triisocyanate, 1,3,5 - triisocyanatobenzene, 2,4,6-triisocyanatotoluene, 4,4'-diphenyl-dimethyl methane - 2,2', 5,5'-tetraisocyanate, the polymerized polyisocyanates, such as tolylene diisocyanate dimers and trimers and polymethylene - polyphenylene polyisocyanates having NCO functionalities of 2 and 3. Other polyisocyanates include polyaromatic polyisocyanates sold commercially by Mobay Chemical Corporation under the "MRS" series and by UpJohn Company under the "PAPI" series. These polyisocyanates are made up of aromatic rings linked together by methylene bridges with substantially all of the NCO groups being in the para position. The isocyanate functionality of these polyisocyanates averages between 2 and 4.

Other useful polyisocyanates are the so-called prepolymers which are the reaction products of diisocyanates and polyols reacted in the ratio of one mole of diisocyanate for each hydroxyl group of the polyol. The diisocyanates used in making the prepolymers are those referred to hereinabove. The polyols are aliphatic hydrocarbon diols, triols, or tetraols, such as ethylene glycol, propylene glycol, 1,4-butylene glycol, 1,6-hexylene glycol, glycerol, trimethylol ethane, trimethylol propane, pentaerythritol, and the like. Other useful polyols are polyether diols and triols, such as polyoxyethylene glycol, polyoxypropylene glycol, polyoxybutylene glycol and block copolymers of ethylene oxide and propylene oxide. Triols made by reacting ethylene oxide or propylene oxide with trimethylol ethane or trimethylol propane are also useful. The molecular weights of useful polyether polyols will vary from about 200 to about 2000.

Additional useful polyols are hydroxy terminated polyesters which are polymers made from caprolactone and low molecular polymers made by the reaction of di- or tribasic acids with diols or triols. Such polymers have molecular weight which vary from about 500 to about 3000.

In preparing the oligomers of this invention, the p-vinylphenol and the polyisocyanate are reacted in the equivalent ratio of one mole of p-vinylphenol for each isocyanate group in the polyisocyanate. The reaction is conducted under anhydrous conditions in order to prevent loss of isocyanate groups to side reactions. The reaction components are mixed together, preferably in a solvent, and are held at a temperature of about 20° C. to about 100° C. until substantially all of the isocyanate groups have reacted. The two components can be mixed together all at once or one can be added slowly to the other. Preferably, p-vinylphenol is slowly added to the polyisocyanate. In order to facilitate the reaction of the phenolic hydroxyl with isocyanate groups, urethane forming catalysts can be used. Examples of such catalysts are tin catalysts, i.e., dialkyl tin carboxylates, dialkyl tin dichlorides, trialkyl tin carboxylates, trialkyl tin chlorides and trialkyl tin oxides. Specific examples are dibutyl tin diacetate, dibutyl tin dilaurate and dibutyl tin dichloride. Other catalysts are titanium chelates, e.g., titanium oxalate, titanium glycolate and glycerol titanate. The urethane forming catalysts are used in the amount of about 0.5 to about 5 percent by weight based on the weight of reactants and, preferably, in the amount of about 1 to about 2 weight percent.

Solvents which can be used in the invention are hydrocarbons, ethers, esters and ketones which are free of hydroxyl groups, acid groups and amino groups, i.e., groups which are reactive with isocyanate groups.

In order to prevent polymerization of the vinyl phenol, polymerization inhibitors, such as molecular oxygen, hydroquinone and t-butyl catechol can be used in the amounts of about 10 ppm up to about 1 weight percent based on the weight of vinyl phenol.

The polymerizable polyethylenically unsaturated urethane oligomers of this invention are particularly useful as components in radiation curable coatings compositions. When used in such coating compositions, the oligomers of this invention are blended with other monomers and additives. By such blending techniques, coating compositions having proper application properties and coating properties can be obtained.

Other monomers which are blended with the monomers of this invention are polyethylenically unsaturated radiation polymerizable compounds which contain two or more ethylenically unsaturated groups and, preferably, two to about six ethylenic groups. The ethylenically unsaturated groups are acrylate and methacrylate groups, vinyl groups and allyl groups. Compounds which contain the acrylate or methacrylate groups are acrylic or methacrylic acid esters of polyols wherein the polyols have two or more hydroxyl groups per molecule. Examples of such compounds are the diacrylic or dimethacrylic acid esters of ethylene glycol, propylene glycol, butanediol, betenediol, hexanediol, polyoxyethylene glycols, polyoxypropylene glycols, polyoxybutylene glycols, di- and triacrylic or methacrylic acid esters of glycerine and hexanetriol, timethylolpropane, trimethylolethane, di, tri and tetra acrylic acid or methacrylic acid esters of pentaerythritol, the di, tri, tetra, penta and hexa acrylic or methacrylic acid esters of dipentaerythritol and the like. Other polyacrylates or methacrylates are the acrylated and methacrylated epoxy compounds, such as the acrylated or methacrylated glycidyl ethers of dihydric phenols, acrylated and methacrylated epoxidized vegetable oils, acrylated and methacrylated urethanes and acrylated and methacrylated polyesters.

Examples of polyvinyl and polyallyl compounds are divinylbenzene, divinyltoluene, diallylbenzene, diallyltoluene, diallyl terephthalate, diallymaleate, diallylfumarate and the like.

Additional monomers which can be used in this invention are the well known monomeric compounds which contain one ethylenically unsaturated group per molecule. Examples of such monomers are alkyl acrylates and methacrylates wherein the alkyl group contains from 1 to 12 carbon atoms, mono and polyalkoxyalkylacrylates and methacrylates wherein the alkoxy groups and alkyl groups contain from 1 to 4 carbon atoms and wherein the molecules contain from 1 up to 20 alkoxy groups, hydroxyalkyl acrylates and methacrylates wherein the alkyl group contains from 1 to 6 carbon atoms, vinyl aromatic compounds, vinyl halides, vinyl pyrrolidone, vinyl pyridine, vinyl carbazole and the like.

The radiation curable compositions can be cured by any of the normal actinic radiation curing methods. The radiation can be ionizing radiation (either particulate or nonparticulate) or non-ionizing agents. As a suitable source of particulate radiation, one can use any source which emits electrons or charged nuclei. Particulate radiation can be generated by electron accelerators, such as the Vander Graff accelerator, resinous transformers, linear accelerators, insulating core transformers, radioactive elements, such as cobalt 60, strontium 90, and the like. As a suitable source of nonparticulate non-ionizing radiation, any source which emits radiation in the range of from $10^{-3}$ angstroms to 2000 angstroms can be used. Suitable sources included vacuum ultraviolet lamps, such as xenon or krypton arcs. As a suitable source of non-ionizing radiation, any source which emits radiation from 2000 angstroms to 4000 angstroms can be used. Suitable sources include mercury arcs, carbon arcs, tungsten filament lamps, sun lamps and lasers. All of these devices and sources are well known in the art and those skilled in radiation technology are fully aware of the manner in which radiation is generated and the precautions to be taken in its use.

When the radiation curable coating compositions are to be cured by exposure to non-ionizing radiation, e.g., ultraviolet radiation, photoinitiators may be added to the compositions. Suitable photoinitiators which are well known in the art include 2,2-diethoxy-acetophenone, 2,3 or 4-bromoacetophenone, benzaldehyde, benzoin, benzophenone, 9,10-dibromoanthracene, 4,4'-dichlorobenzophenone, 2,3-pentanedione, hydroxycyclohexylphenyl ketone and xanthone. Such photoinitiators are generally added in amounts of from about 0.1 weight percent up to 10 weight percent based on the weight of the total curable composition and, preferably, 1 to 5 weight percent.

Photoactivators can also be used in combination with the photonitiators. Examples of photoactivators are methylamine, tributylamine, 2-aminoethanolamine, cyclohexylamine, diphenylamine and tribenzylamine.

The radiation curable coating compositions are made by blending (A) about 20 to about 60 weight percent of the urethane oligomers of this invention with (B) about 10 to about 80 weight percent of a polyethylencially unsaturated radiation polymerizable monomer and (C) 0 to about 40 weight percent of a monoethylenically unsaturated monomer, said weight percents being based on the total weight of (A), (B) and (C).

The radiation curable coating compositions can be applied by conventional means, including spraying, curtain coating, dip padding, roll coating and brushing procedures. The coatings can be applied to any acceptable substrate such as wood, metal, glass, fabric, papaer, fiber, plastic and the like.

Additional additives which can be used in the compositions include wetting agents, fillers, defoamers, dyes and pigments, the uses of which are well known in the art.

The invention is described in greater detail by the following examples. Parts and percentages unless otherwise designated are parts and percentages by weight.

EXAMPLE 1

To a suitable reactor equipped with a stirrer, condenser, thermometer and dropping funnel are added 25.06 parts of toluene diisocyanate and to the dropping funnel 72.8 parts of p-vinylphenol solution - 50 weight percent p-vinylphenol in methyl isobutyl ketone stabilized with 0.1 weight percent monomethyl ether of hydroquinone. Dry air as a sparge is introduced into the dropping funnel and the reactor and is continued throughout the reaction. The p-vinylphenol solution is added slowly to the reactor over a three hour period. with the temperature rising from 25° C. to 29° C. Methyl isobutyl ketone is added during the reaction to control the viscosity. A total of 40 parts is added. The reactants are checked periodically for disappearance of isocyanate groups. After 20 hours at 25°–30° C. and 16 hours at 50° C., the isocyanate group is substantially gone. The reaction product is placed in a thin film evaporator and vacuum is applied to remove solvent. The resulting divinyl diurethane product has a melting point of 125°–130° C. Nuclear magnetic resonance is used to verify the theoretical structure.

EXAMPLE 2

To a reactor equipped as described in Example 1 are added 44.4 parts of isophorone diisocyanate. To the dropping funnel are added 48 parts of p-vinylphenol dissolved in an equal weight of methyl isobutyl ketone and stabilized with 0.1 percent monomethyl ether of hydroquinone. Heat is applied raising the temperature to 80° C. The addition of p-vinylphenol solution is begun and is completed over a two hour period. Heating at 80° C. is continued for one hour. Analysis shows unreacted isocyanate groups. The reactants are reheated to 70° C. and 0.5 part of dibutyltin dilaurate is added. The temperature is raised to 85° C. and is held at this temperature for 2.5 hours. Analysis shows substantially no isocyanate groups.

The product solution is placed in a thin film evaporator and the solvent is removed under vacuum. The resulting waxy solid has a melting point of 110.5° C.

EXAMPLE 3

To a suitable reactor equipped as described in Example 1 are added 21.83 parts of methylene bis (cyclohexyl isocyanate) and 0.5 part of dibutyl tin dilaurate. A solution is made of 20 parts of p-vinylphenol, 80 parts of acetone and 0.2 part of the monomethyl ether of hydroquinone. The solution is added to the stirred reactor over a six hour period while holding the temperature at 25° C. After 8 hours additional stirring, analysis shows substantially no isocyanate groups. The solvent is removed by use of a thin film evaporator under vacuum.

EXAMPLE 4

To a reactor equipped as described in Example 1 are added 87.2 parts of a polyester diol - caprolactone polymer of 530 molecular weight, 73.2 parts of isophorone diisocyanate, 0.5 part of the monomethyl ether of hydroquinone, 1 part of dibutyl tin dilaurate and 70 parts of acetone. The exothermic reaction raises the temperature to 80° C. When the temperature begins to drop, 0.5 part of dibutyl tin dilaurate is added. A solution of 39.6 parts of p-vinylphenol in acetone is added over 3.5 hours with the temperature at 37°–40° C. After 2 additional hours at 40° C., analysis showed substantially no isocyanate groups. The solvent is then removed in a thin film evaporator under vacuum. The resulting product is a tacky solid.

EXAMPLE 5

A blend is made from 30 parts of the product of Example 4, 40 parts of trimethylolpropane triacrylate, 10 parts of ethoxyethoxyacrylate, 20 parts of N-vinyl pyrrolidone and 2 parts of hydroxycyclohexylphenyl ketone. Coatings are drawn down on filled particle board at 0.5 mil thickness and are cured at a line speed of 20–50 ft. per minute with a RPC Ultraviolet Curing Unit, Model QCC-1202 Radiation Polymer Company, Plainfield, IL with one 300 watt per linear inch mercury vapor lamp without an infrared filter. Excellently cured coatings are obtained.

EXAMPLE 6

A blend is made from 10 parts of the product of Example 2, 13 parts of 1,6-hexanediol diacrylate, 10 parts of pentaerythritoltriacrylate, 14 parts of ethyl acrylate and 2 parts of hydroxycyclohexyl phenyl ketone. Coatings are drawn down on glass using a 2 mil wire round rod. The coatings are cured using the procedure described in Example 5. Excellently cured coatings are obtained.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing form the spirit of the invention.

What is claimed is:

1. A radiation curable coating composition comprising a blend of:

A. about 20 to about 60 weight percent of a polymerizable polyethylenically unsaturated oligomer of the formula:

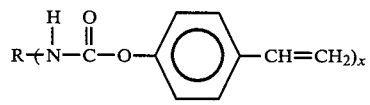

wherein x is an integer having the value of 2 to 4 and R is an organic radical having a valence equal to x, wherein R is the nucleus, after removal of the isocyanate groups of (a) an aliphatic, aromatic, aralkyl, or alkaryl di, tri, or tetraisocyanate, or (b) a prepolymer of an aliphatic, aromatic, aralkyl, or alkaryl diisocyanate and a polyol reacted in the ratio of one mole of diisocyanate for each hydroxyl group of the polyol, wherein the polyol is an aliphatic hydrocarbon diol, triol, or tetraol or a polyether or a polyester diol or triol;

B. about 10 to about 80 weight percent of a polyethylenically unsaturated radiation polymerizable monomer; and C. 0 to about 40 weight percent of a monoethylenically unsaturated radiation polymerizable monomer, wherein said weight percents are based on the weight of (A), (B) and (C).

2. The radiation curable composition of claim 1 wherein the polyethylenically unsaturated radiation polymerizable monomer (B) contains at least two ethylenically unsaturated groups per molecule.

3. The radiation curable composition of claim 2 wherein the polyethylenically unsaturated radiation polymerizable monomer contains 2 to 6 ethylenically unsaturated groups.

4. The radiation curable composition of claim 1 which contains a photoinitiator.

5. The radiation curable composition of claim 4 wherein the photoinitiator is present in the amount of about 0.1 weight percent up to about 10 weight percent based on the total weight of the composition.

6. The radiation curable composition of claim 5 wherein the photoinitiator is present in the amount of about 1 to about 5 weight percent.

7. The radiation curable composition of claim 1 wherein R is the nucleus after removal of the isocyanate groups of a cycloaliphatic di, tri, or tetraisocyanate, or a prepolymer of a cycloaliphatic diisocyanate and a polyol.

8. The radiation curable composition of claim 1 wherein R is the nucleus after removal of the isocyanate groups of a polyaromatic di, tri, or tetraisocyanate wherein the aromatic groups are linked together by methylene bridges.

* * * * *